(12) United States Patent
Schafer

(10) Patent No.: US 9,758,353 B2
(45) Date of Patent: Sep. 12, 2017

(54) WIRELESS CONTROLLABLE CAROUSEL INDEPENDENTLY RELEASABLE GRAPLING HOOKS

(71) Applicant: Innovative Minds, LLC, Enfield, CT (US)

(72) Inventor: George H. Schafer, Enfield, CT (US)

(73) Assignee: Innovative Minds, LLC, Enfield, CT (US)

( * ) Notice: Subject to any disclaimer, the term of this patent is extended or adjusted under 35 U.S.C. 154(b) by 0 days.

(21) Appl. No.: 15/214,446

(22) Filed: Jul. 19, 2016

(65) Prior Publication Data

US 2016/0332843 A1    Nov. 17, 2016

Related U.S. Application Data

(63) Continuation-in-part of application No. 14/854,011, filed on Sep. 14, 2015, now abandoned, which is a continuation-in-part of application No. 14/097,238, filed on Dec. 4, 2013, now Pat. No. 9,132,995.

(51) Int. Cl.
| | |
|---|---|
| *B66C 1/22* | (2006.01) |
| *B66C 1/34* | (2006.01) |
| *B64D 1/22* | (2006.01) |

(52) U.S. Cl.
CPC . *B66C 1/34* (2013.01); *B64D 1/22* (2013.01)

(58) Field of Classification Search
CPC ..................................................... B66C 1/34
USPC ........... 294/82.31, 82.3, 82.34, 82.24, 82.26, 294/82.1, 82.33, 66.1; 244/118.1, 137.1, 244/137.4
See application file for complete search history.

(56) References Cited

U.S. PATENT DOCUMENTS

| | | | | | |
|---|---|---|---|---|---|
| 1,632,529 | A | * | 6/1927 | Bauer | B63B 21/243 114/305 |
| 3,202,449 | A | * | 8/1965 | Lemelson | B25J 15/0213 294/106 |
| 3,370,213 | A | * | 2/1968 | Rose | B25J 13/082 294/106 |
| 4,185,864 | A | * | 1/1980 | Phillips | B66C 1/34 294/66.1 |
| 4,351,553 | A | * | 9/1982 | Rovetta | B25J 15/0009 294/106 |
| 4,579,380 | A | * | 4/1986 | Zaremsky | B25J 13/082 294/119.1 |
| 4,600,357 | A | * | 7/1986 | Coules | B25J 13/082 294/106 |
| 4,924,738 | A | * | 5/1990 | Che | B23B 13/02 269/156 |
| 5,501,498 | A | * | 3/1996 | Ulrich | B25J 9/102 294/106 |

(Continued)

*Primary Examiner* — Paul T Chin
(74) *Attorney, Agent, or Firm* — Damian Wasserbauer, Esq.; Wasserbauer Law LLC

(57) ABSTRACT

The present invention is a controllable hook assembly having an actuator operably connected to an arm motor assembly and a drive assembly configured to move independently a plurality of hook arms between an open and closed position capture and release a load. A controller is configured to operate each drive assembly to move the hook arms cooperating with screw threads in said actuator to provide rotation about a pivot point to drive each of the hook arms between an open and a closed position so as to allow for independent actuation of each of the hook arms.

5 Claims, 7 Drawing Sheets

(56) References Cited

U.S. PATENT DOCUMENTS

| | | | |
|---|---|---|---|
| 8,021,435 B2* | 9/2011 | Bravo Castillo | A61F 2/588 623/64 |
| 8,414,043 B2* | 4/2013 | Albin | B25J 15/0213 294/106 |
| 8,534,729 B2* | 9/2013 | Wilkinson | B25J 15/08 294/106 |

* cited by examiner

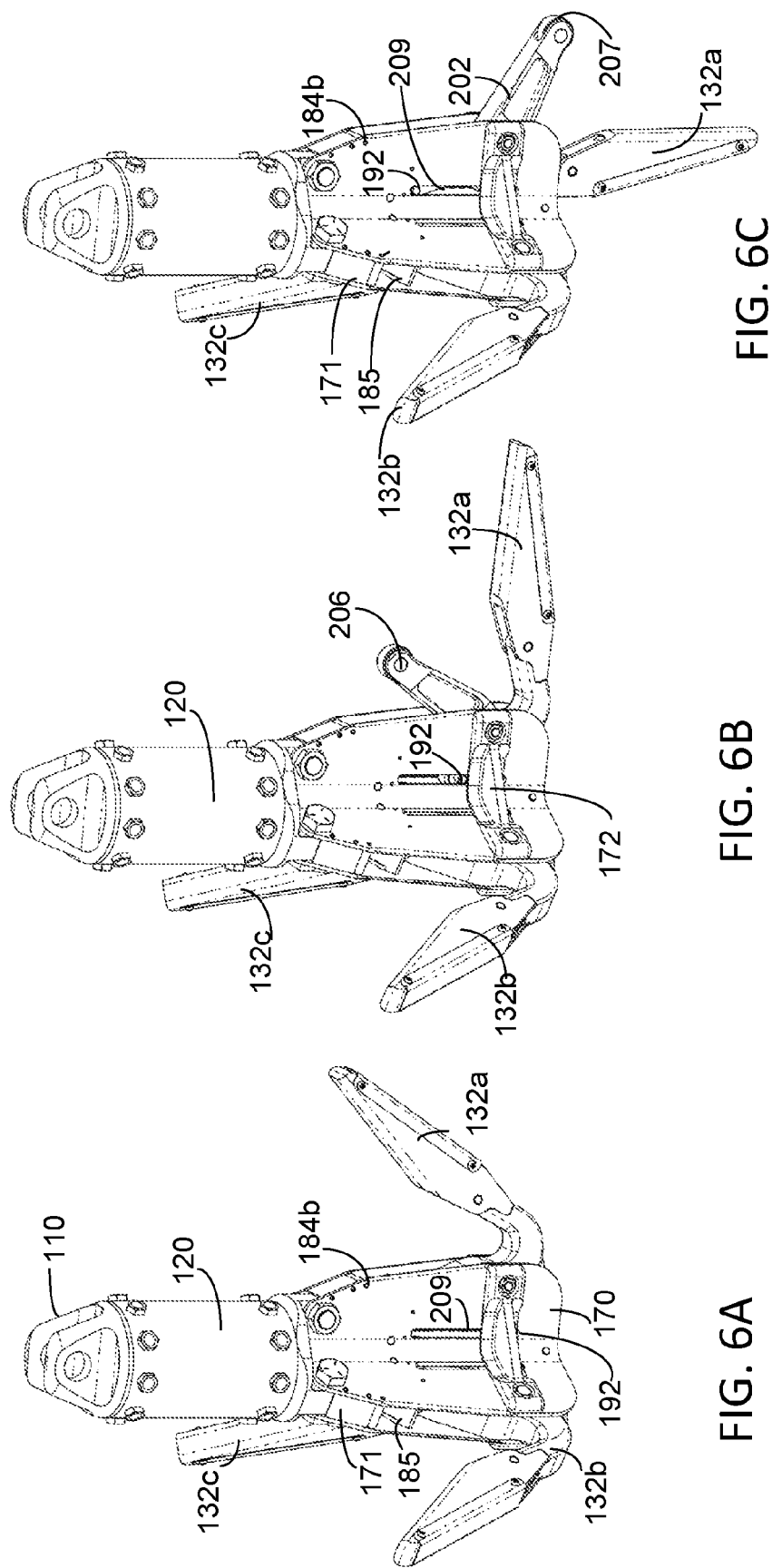

WIRELESS CONTROLLABLE CAROUSEL INDEPENDENTLY RELEASABLE GRAPLING HOOKS

CROSS-REFERENCE TO RELATED APPLICATIONS

This application is continuation-in-part of co-pending application Ser. No. 14/854,011, filed Sep. 14, 2015, and also is a continuation-in-part of application Ser. No. 14/097,238, filed Dec. 4, 2013, now U.S. Pat. No. 9,132,995 issued Sep. 15, 2015, the entire disclosure of which are incorporated hereinto by reference thereto.

FIELD OF THE INVENTION

The present invention relates to a cargo hook and, more particularly, is an apparatus, system and method for a controllable hook assembly with an independent hook arm release assembly allowing for individual cargo payloads to be captured on to each arm and released at one or more locations during a mission without returning to the distribution center advantageously adding loads to a mission, saving flight hours, and reducing expense.

BACKGROUND OF THE INVENTION

Conventional cargo hook devices and payload attachment systems utilize a single release mechanism for picking up external payloads using helicopters, or other lifting devices. A single release grappling hook mechanism also means that a single mission delivers one or more payload(s) to a single location. As a result conventional cargo hook devices with single release mechanism payload attachment systems have numerous disadvantages and limitations as the payload is required to be distributed to the particular location such as, for example, a helicopter delivers a payload to particular location on a single mission.

There is a need for a cargo hook arm release mechanism that allows for individual capture and release of loads connected to each arm of the cargo hook device. There is a long-felt need for improved efficiency in helicopters delivering payloads during a single mission to multiple locations without having to return to the central distribution center, which adds expense, delivery time, and the ability to distribute payloads to different locations. There also is a need for a cargo hook arm release mechanism for picking up external payloads from one or more location(s) during a particular mission without the need for an attendant. In distribution As a result, the present invention has advantages that allow for repeated capture of loads one or more locations, and distribution to one or more locations, by a helicopter or other lifting devices on a single mission.

SUMMARY OF THE INVENTION

It is an object of the present invention to provide a cargo hook arm release mechanism that allows for independent capture and release of loads connected to each arm of the cargo hook device.

It is an object of the present invention to provide improved efficiency in delivering payloads during a single mission to multiple locations without having to return to the central distribution center, which adds expense and delivery time.

It is an object of the present invention to provide a cargo hook arm release mechanism for picking up external payloads from one or more location(s) during a particular mission without the need for an attendant.

It is an object of the present invention to provide a cargo hook arm release apparatus, system and method to distribute one or more payloads to one or more locations by a helicopter or other lifting device on a single mission.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein:

FIGS. 6A, 6B and 6C are schematic, perspective views illustrating independent a cargo hook arm release mechanism allowing for independent capture and release of loads with arms in the closed position, as shown in FIG. 6A, a first arm in a closed position, as shown in FIG. 6B, and the arm in an open position, as shown in FIG. 6C, in accordance with an embodiment of the apparatus, system and method of the present invention.

DESCRIPTION OF THE EMBODIMENTS

Figure 1:
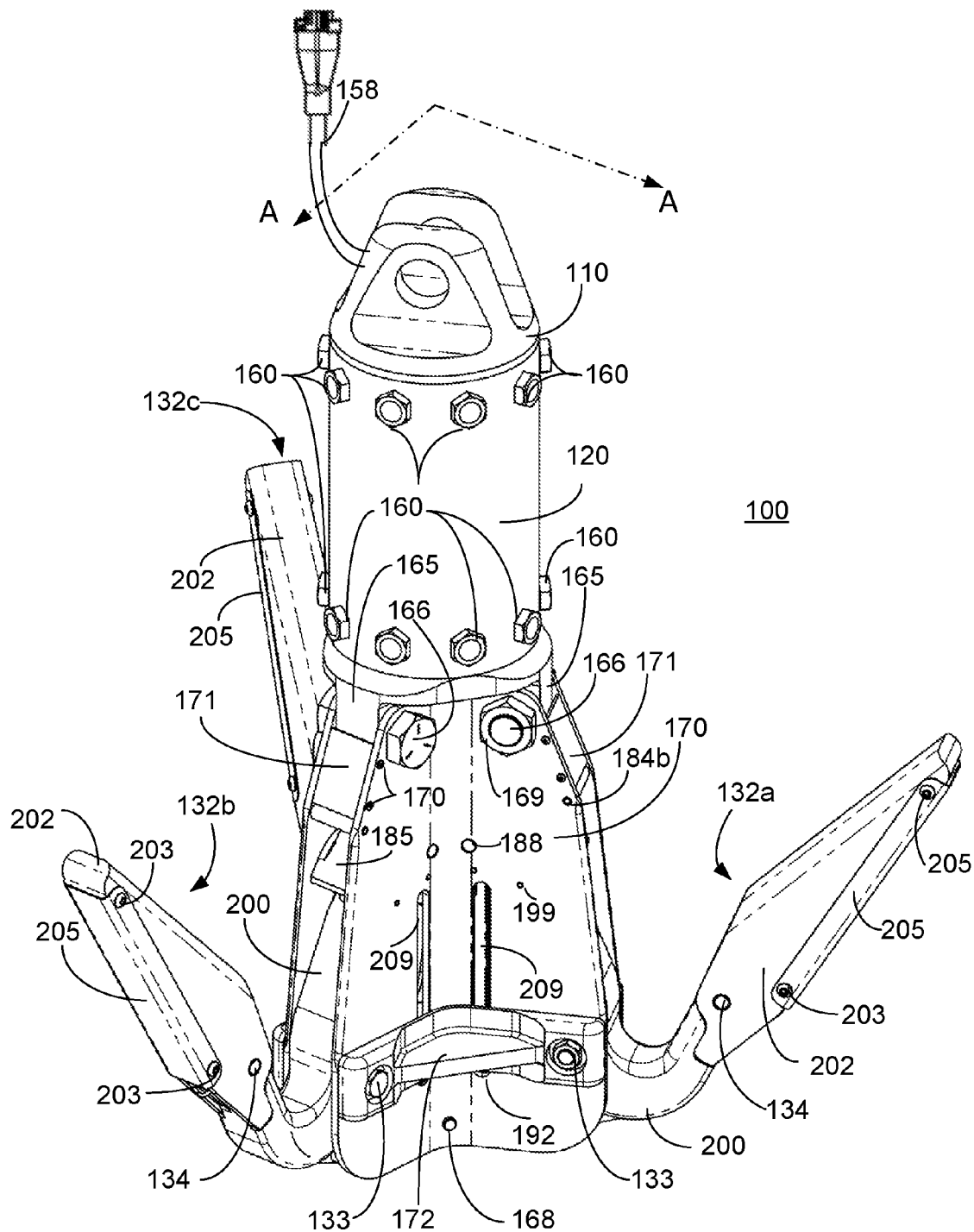
FIG. 1 is a schematic, perspective view illustrating a cargo hook arm release mechanism that allows for independent capture and release of loads connected to each arm of the cargo hook device in accordance with an embodiment of the apparatus, system and method of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "controllable hook" or "hook assembly" refers to an apparatus, system and method for a grappling hook that eliminates the need for an attendant to secure the payload to the lifting device. The controllable hook can be implemented with little to no modification to the lifting platform. The controllable hook can be implemented with a means to capture the payload without the need for additional special equipment. The controllable hook can be controlled thereby allowing the lifting device operator to control the position of the load-capture arms to facilitate load capture and release as is illustrated in parent U.S. Pat. No. 9,132,995 FIGS. 2, 3A, 3B, 4A to 4B, 5A to 5B, 6A to 6C, 7, 8A to 8D, and 9A to 9B, application Ser. No. 14/097,238, filed Dec. 4, 2013, issued Sep. 15, 2015, the entire disclosures of which is incorporated hereinto by reference. The controllable hook can minimize the accuracy needed by the lifting device operator to capture the payload. The controllable hook can allow installation on any platform intended to lift payloads and allow use of the device in any environment, whether the payload is on the ground, in the air, or in water.

As used herein, the term "line" refers to a line, cable, chain, rope or other device also shown in parent U.S. Pat. No. 9,132,995 drawing FIGS. 4A and 4B, 5A and 5B, 7A, 7B and 7C through 9A and 9C. The line 102 can to secure a load to the hook assembly 100. Similarly the line 102 can secure the hook assembly 100 by looping around the pin 112 of the upper assembly 110 to the lifting means such as a helicopter as shown in U.S. Pat. No. 9,132,995 drawing FIGS. 5A and 5B. In most cases this will be via a flexible cable, rope, chain, or other structurally sound means of connecting the two. Line can also refer to a communication line such as a cable.

Referring now to FIGS. 1 through 6C, a wireless controllable carousel independently releasable hook arm assembly, apparatus, system and method is shown generally designated as a hook assembly 100. The hook assembly 100 is configured with an upper assembly 110, a main body 120, a drive assembly 130, a lower assembly 140, and a controller 150 (not shown, incorporated by reference). The drive assembly 130 is housed within the main body 120 of the hook assembly 100 and may be configured as a multi-motor drive assembly 210 having a motor 211 and gear 212 associated with an individual arm 132, for example, arm 132a, a motor 213 and gear 214 associated with arm 132b, and a motor 215 and a gear 216 associated with an arm 132c, as is illustrated in FIGS. 2A, 2B, 3, and 4. The controller 150 is operably connected via cable 158 to the control circuitry 114 and processor 118 so as to operably actuate to open and close positions each of the arms 132a, 132b and 132c, as shown in FIGS. 2, 3-4 and 5A-5C, or an individual arm as shown in FIGS. 1-4 and 6.

Figure 2A:
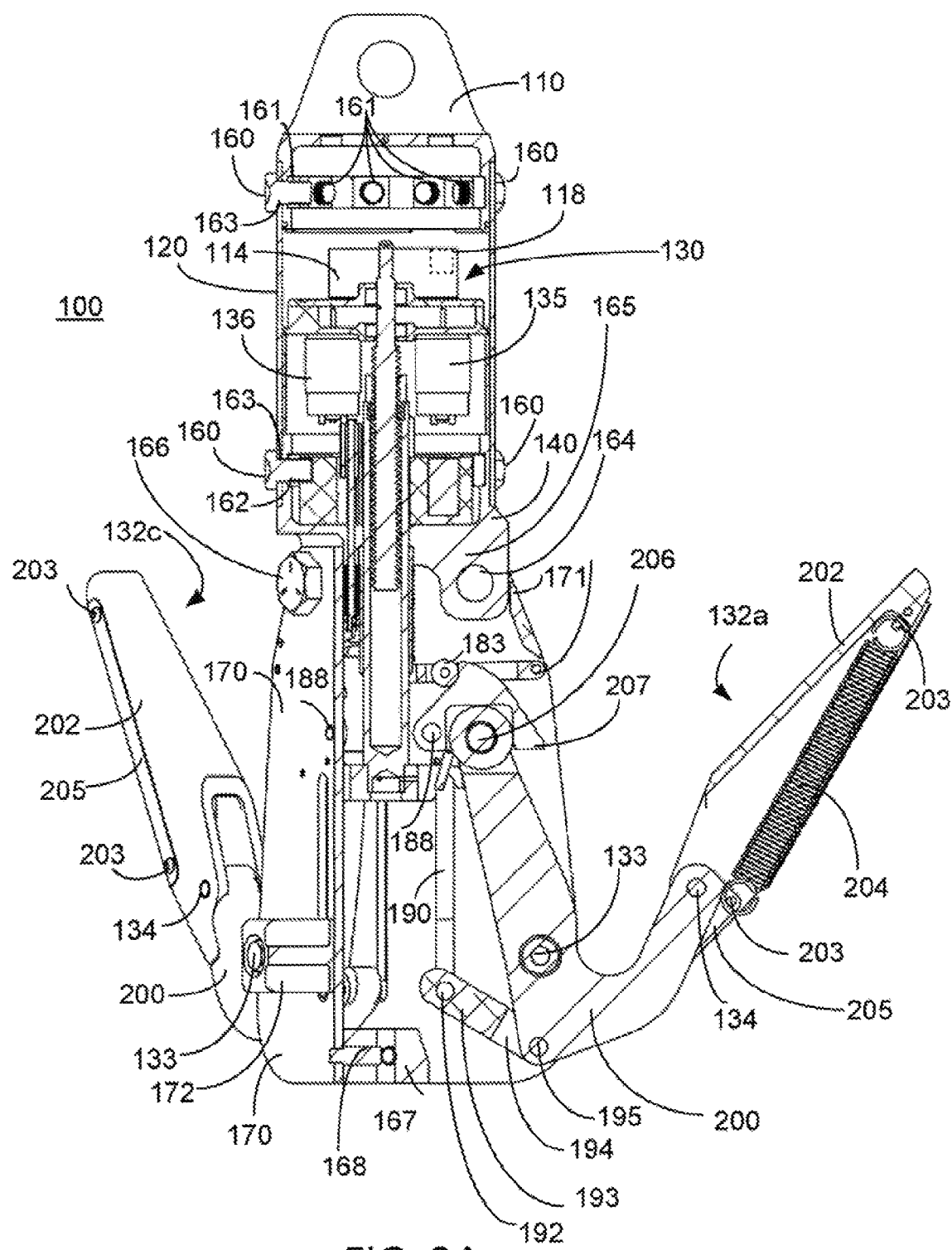
FIGS. 2A and 2B are schematic, perspective cross sectional views, taken along lien A-A of FIG. 1, illustrating a cargo hook arm release mechanism allowing for independent capture and release of loads between a closed position, as shown in FIG. 2A, and a released open position, as shown in FIG. 2B, in accordance with an embodiment of the apparatus, system and method of the present invention.
Figure 2B:
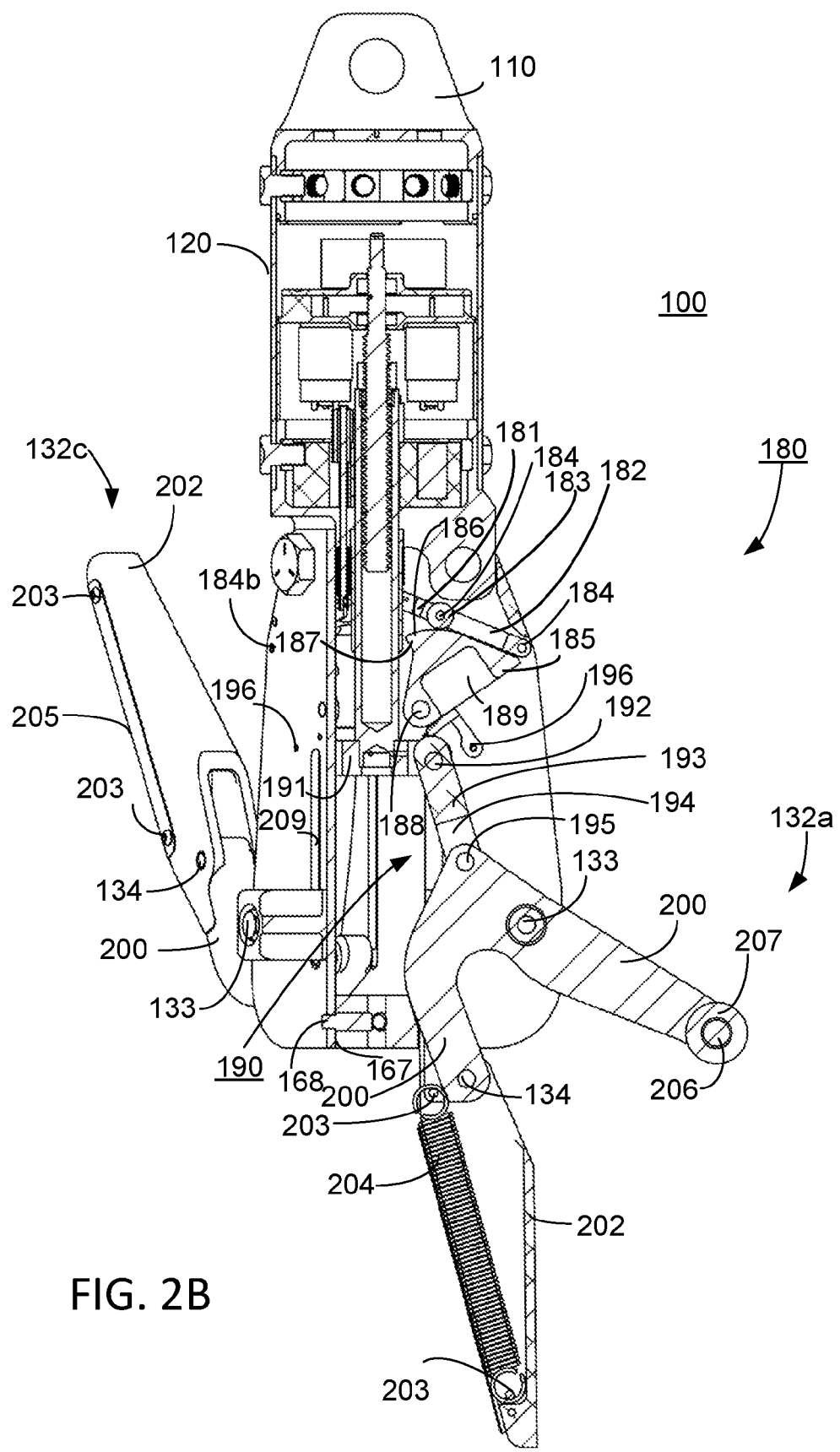

Referring to FIGS. 1, 2A and 2B, the upper and lower assemblies 110 and 140, respectively, are structurally joined to the main body 120 by fasteners 160, for example, fasteners cooperating with threaded holes 161 in the upper assembly 110 and threaded holes 162 in the lower assembly 140. Holes 163 may be formed in the main body 120 to receive the fasteners 160 so as to join and secure main body 120 to the upper and lower assemblies 110, 140, respectively. In addition, the lower assembly 140 may be formed with one or more holes 164 in a connector flange 165 so as to secure an upper edge of a cover plate 170 thereto by fastener 166 for protecting the arms 132 in operation. Similarly, a lower block 167 and one or more pins 168 may be used to secure the cover plate 170 at a lower edge so as to protect the arms 132a, 132b and 132c and keep environmental contaminants from fouling the linkages, connections, and the operation thereof.

A shield portion 171 may be formed integral to the cover plate 170, or may be formed separately and attached between separate cover plates 170 by one or more shield pins 173, welding, adhesives, or other fasteners. The cover plates 170 may further include a brace portion 172 that extends along the arcuate outer surface of a cover plate 170, for example, each cover plate 170 forms a protective exterior surface of about one third, or an arc of about one-hundred twenty degrees (120°), with the brace portion 172 conforming to such 120° arc. The brace portion 172 is configured with a whole adapted to fix a root arm segment 200 receive the pivot pin 133 between cover plate portions 170 surrounding each arm 132, for example, cover portions 170 adjacent arm 132a.

An arm cover plate 170 is provided to shield the arms in operation and advantageously may also contain mounting holes for various internal components such as, for example, the release and actuation mechanism 180 pin 184b so as to secure the upper bracket 181 in the proper aligned internal position, a hole to accept the pivot pin 188 of the cam 185 for smooth and fixed rotation of the cam in operation, and a hole to accept a stop bar pivot pin 199 so as to keep within internal fixed relationship in a while rotation thereof, each shown in FIGS. 1-4. Moreover, the opening and closing mechanism of the present invention is facilitated by the slot 209 opening where the base pivot 192 for each root arm 200 slides therein and there-between so as to move the release and actuation assembly 180 between the closed position and open position for each of the arms 132, e.g. independently each arm 132a, 132b and 132c may be moved between the open and close positions as shown in FIGS. 5A-5C and 6A-6C. A shield portion 171 may be disposed between adjacent sides of arm cover plates 170 and secured by shield pins 173. A brace portion 172 also may be disposed on the arm cover plates so as to add structural support when securing the arm pivot points 133 for each of the hook arms 132, for example, 132a, 132b and 132c.

Figure 3:
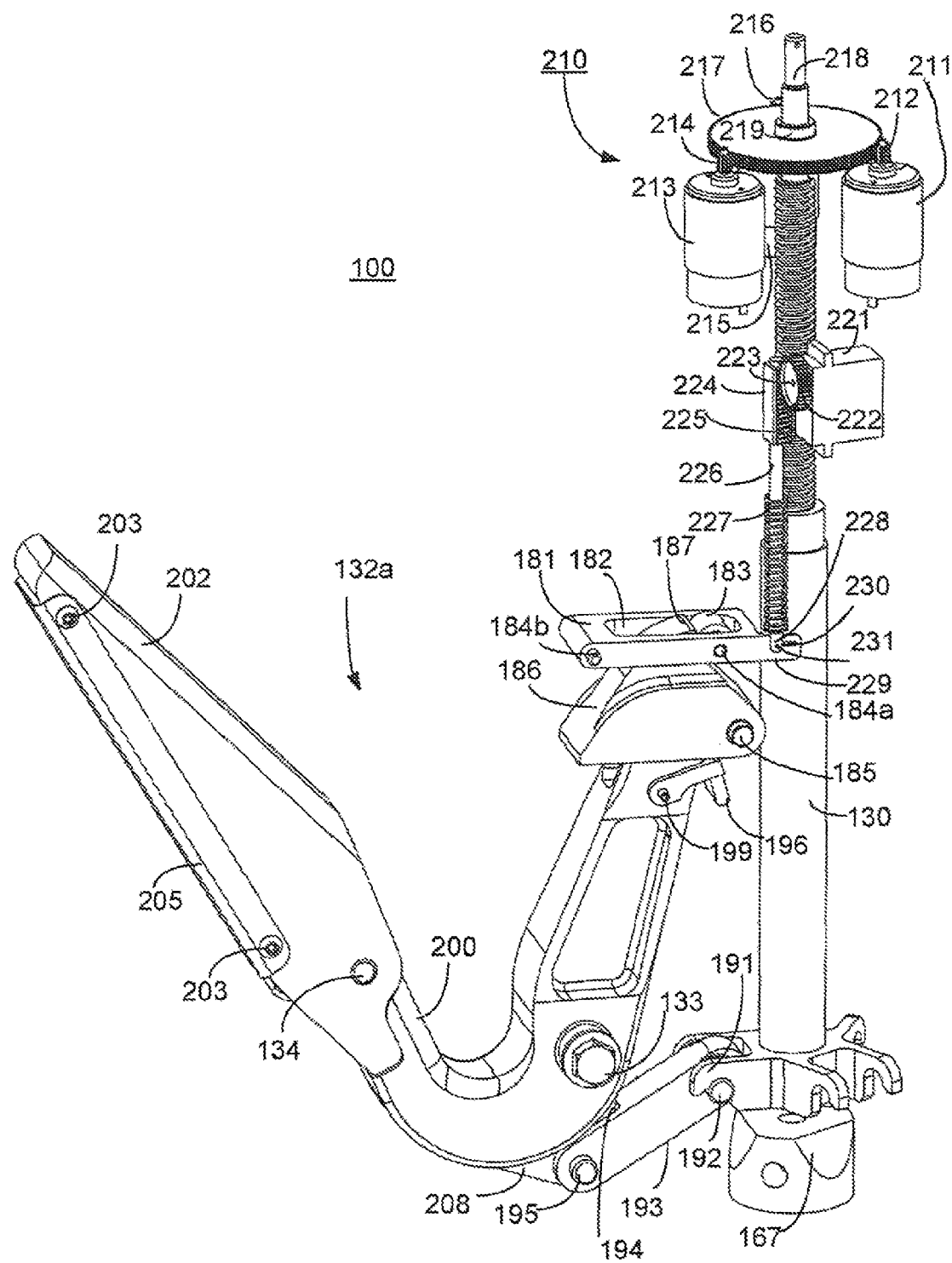
FIG. 3 is a schematic, perspective view illustrating a cargo hook arm release assembly in a closed position for holding the cargo payload in accordance with an embodiment of the apparatus, system and method of the present invention.
Figure 4:
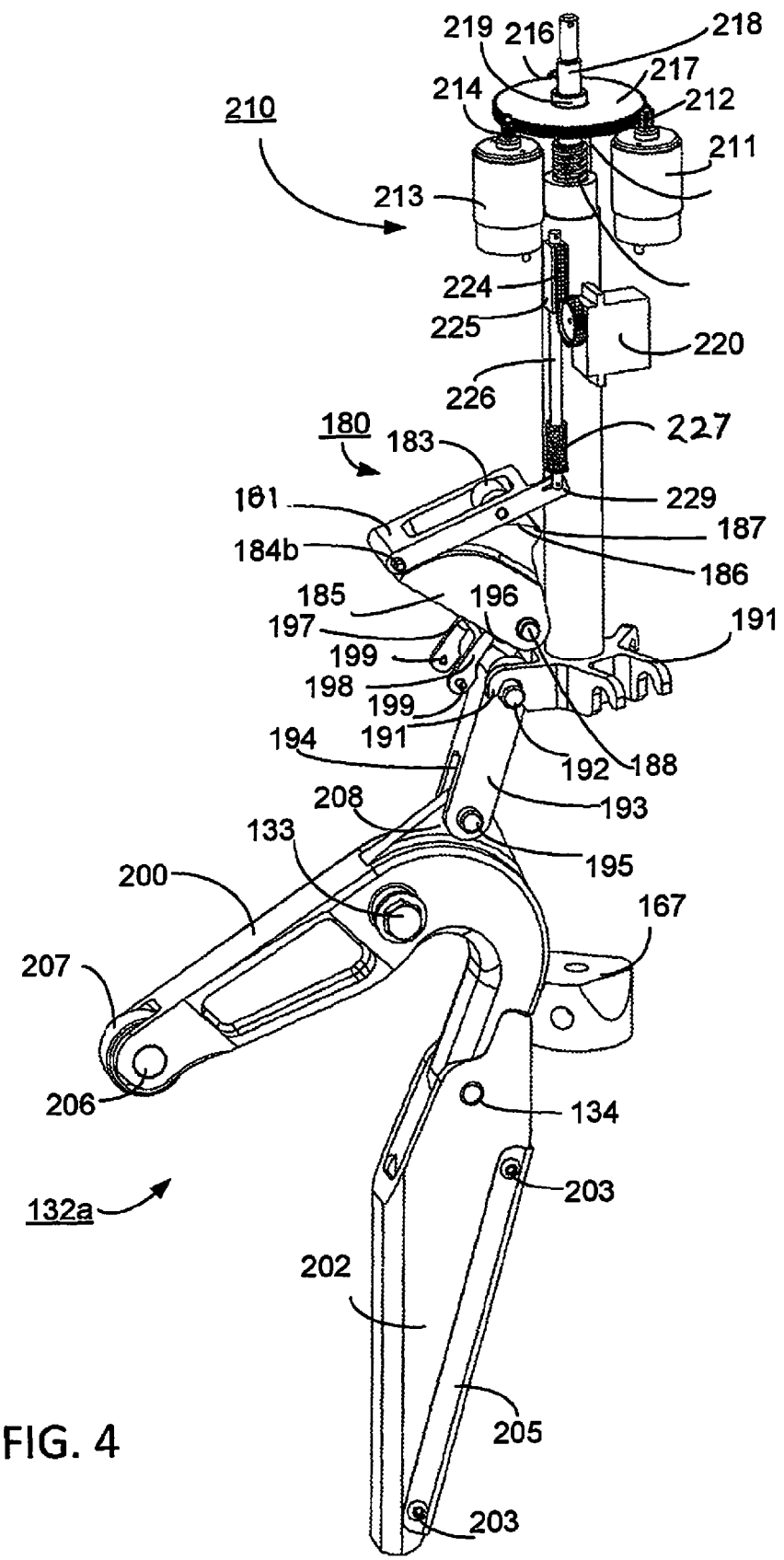
FIG. 4 is a schematic, perspective view illustrating a cargo hook arm release assembly in an open position for capturing or releasing the cargo payload in accordance with an embodiment of the apparatus, system and method of the present invention.

The release and actuation assembly 180 comprises a bracket 181 with a central opening 182 adapted to receive an upper roller 183 disposed therein secured therein by a pin 184a, as is shown in FIGS. 3-4. Another pin 184b may be formed on a distal edge apart from a projection 229 for connecting to the linkage assembly 226 that may be received and secured in a corresponding hole aligned in the arm cover plate 170 so as to allow the bracket 181 to rotate about pin 184b. The release and actuation assembly 180 includes a cam 185 configured with an arcuate surface 186, a lip catch 187, and a pivot pin 188. The lip catch 187 is adapted to be received in the opening 182 of the bracket 181. The cam 185 may be configured with an inner recess 189 adapted to receive a roller 207 of the root arm 200 so as to securely lock in a closed position. The roller 207 is configured to be held on an end of the root arm 200 internally disposed by a roller post 206. The rotational movement of the roller 207 advantageously reduces friction in the release and actuation assembly 180 when operated between the open and close positions, for example, when the cam lip 187 is released, the cam rotates around pivot 188 to open the inner recess 189 outwardly and the roller 207 is released therefrom, e.g. allowing the arm 132a to open position is shown in FIGS. 6A-6C.

The release and actuation assembly 180 is operably connected an arm release motor assembly 220 configured to actuate an individual arm, for example, the arm 132a may be actuated by energizing the motor 221 as is described herein and shown in FIGS. 3-4. For ease of illustrating the operation, the arm 132a is operably coupled to the arm release motor assembly 220 as shown in FIGS. 3 and 4, and each arm 132a, 132b, 132c may be configured to include an arm release motor assembly to provide the function of operating the arms 132a, 132b, and 132c independently of each other. An arm release motor assembly 220 further is utilized to release the cam lip 187 from the roller 183 and to return the cam lip 187 to the closed position adjacent the roller 183. A motor 221 is configured with a gear wheel 222 set on a post pin 223. The gear wheel 222 is disposed adjacent a transverse gear 224 disposed on an upper arm gear portion 225 attached to motor-to-linkage assembly arm 226 with lower spring 227 disposed there around having a connection portion 228 at a lower arm portion adapted to connect to the projection 229 in the assembly 180 at a slot 230 by the pin 231. The gear wheel 220 operates to translate rotational motion to linear motion so as to drive the transverse gear 224 attached to the motor-to-linkage assembly arm 226 downwardly so as to compress the spring 227 and move the projection 229 upwardly with the other end of the assembly 180 held in the pivot 184b secured to the cover 170 as shown in FIGS. 1 and 4. The upward movement releases the lip 187 and the cam rotates around pivot 188 and is stopped by the cam stop bar 196, as shown in FIG. 4. The cam stop bar 196 may be configured with a stop bar arm 197 and a stop bar arm 198 each having at a distal point a stop bar pivot pin 199 formed thereon. Similarly, the root arm 200 is linked to the assembly through the arm extensions 202, by spring post pins 203 that may be formed with a spring 204 disposed therebetween so as to absorb shocks in operation and a cover 205 to shield from external environmental contaminants. The roller post 206 and roller 207 are configured to interface with the cam inner recess 189. The root arm 200 may be formed with a flattened flange 209 adapted to be disposed in slot 209 allowing for the post and flatten flanged 209 to travel therebetween and rotational movement. Similarly, as illustrated in FIGS. 3 and 4, the lower assembly 140 may be configured with one or more links 190 to each of the arms 132a, 132b and 132c connecting the lower assembly 140 the arms 132a, 132b, 133c between a cover plates 170 using a bar link 193 and connectors 192,195 that may include recess 195 to receive the root arm segment 200 by the connector 195, as shown in FIGS. 1, 2A, 2B, 5A-5C, and 6A-6C.

Suitable materials for fasteners 160, 166 are metal nuts, bolts, rivets, screws, and similarly heat-treated, hardened nuts, bolts, rivets, screws, and fasteners, secured by corresponding nuts, threaded holes 161, 162, welding, adhesives and the like with a construction of suitable strength and durability so as to provide a hook assembly 100 adapted to operate on dead, live, and varying dynamic loads for a maximum expected load scenario, for example, all the forces that are variable within the object's normal operation cycle including construction, environmental, impact, momentum, vibration, slosh dynamics of fluids, fatigue, environmental and other design factors.

Figure 5C:
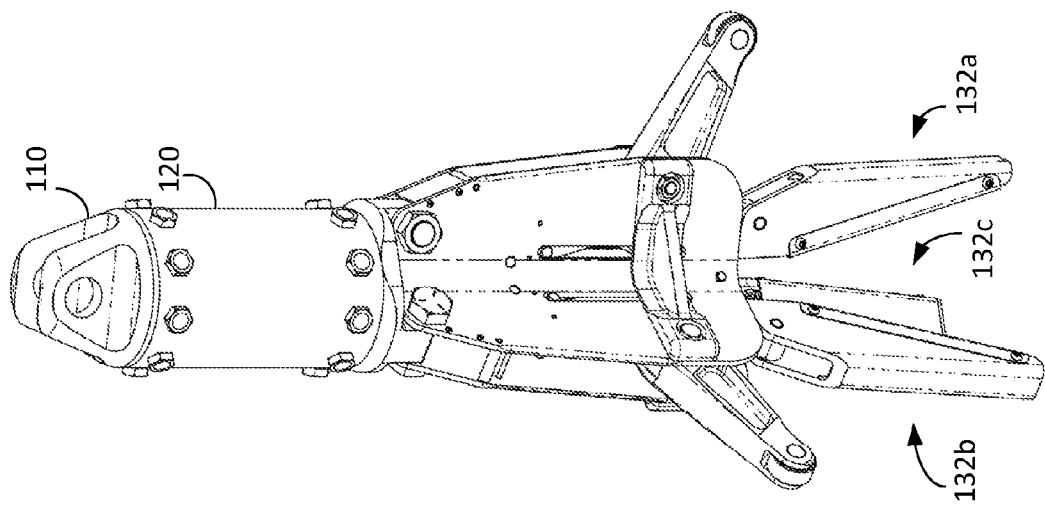
FIGS. 5A, 5B and 5C are schematic, perspective views illustrating independent a cargo hook arm release mechanism allowing for independent capture and release of loads where a first arm releases the cargo payload with remaining arms in the closed position, as shown in FIG. 5A, a second arm releases the cargo payload with remaining arm in the closed position, as shown in FIG. 5B, and a third a second arm releases the cargo payload, as shown in FIG. 5C, in accordance with an embodiment of the apparatus, system and method of the present invention.
Figure 5B:
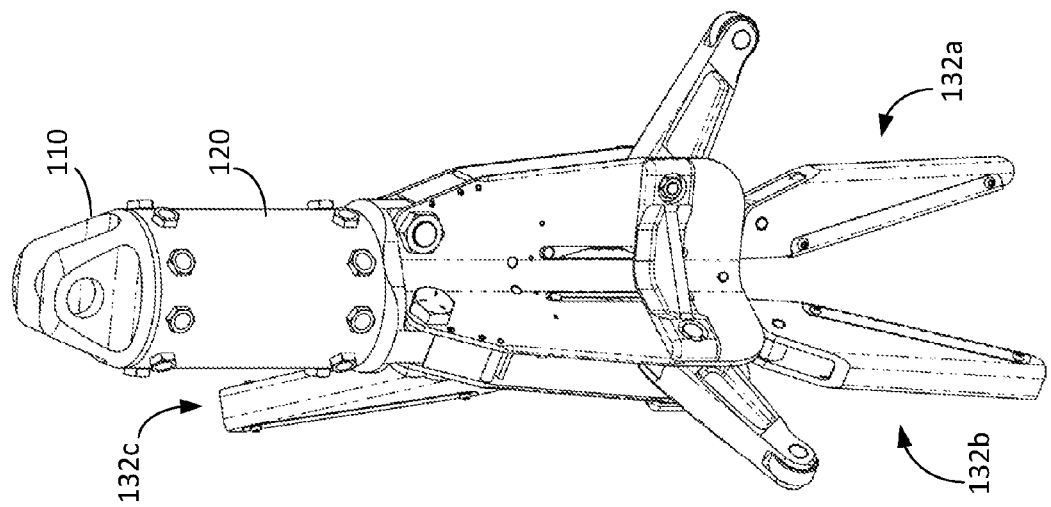
Figure 5A:
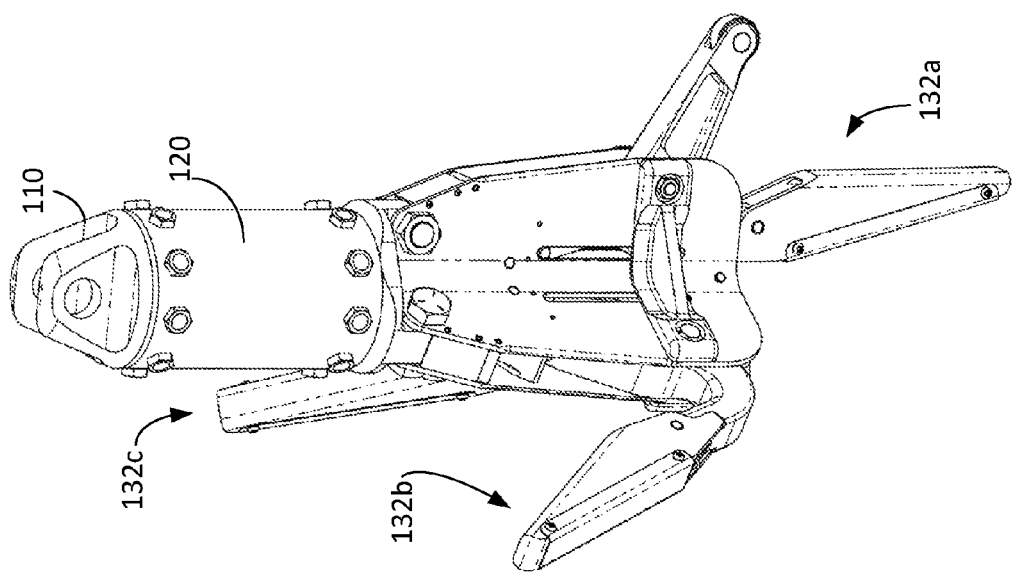

Referring to FIGS. 5A-5C, the hook assembly 100 using the controller 150 may actuate and release an individual arm 132 independent from other arms 132. As shown in FIG. 5A, arm 132a may be actuated and release the load disposed thereon. As shown in FIG. 5B, arm 132b may be actuated and release the load disposed thereon. Similarly, as shown in FIG. 5C, arm 132c may be actuated and release the load disposed thereon. The release and actuation assembly 180 allows advantageously for "in-flight" release which can operate in save the release in emergency situations of the entire hook assembly 100 from the helicopter. Similarly, the release and actuation assembly 180 allows for retaining the hook assembly 100 in an emergency situation that requires release of the external loads attached to the device, and may save the occupants of the helicopter by allowing such release in such a situation the requires the helicopter to lighten its load to adequately increase its maneuvering capability by decreasing its gross weight. According to embodiments of the present invention, the release and actuation assembly 180 for each individual arm 132a, 132b and 132c allows for individual loads to be connected each arm 132a, 132b and 132c of the hook assembly 100 carried to multiple locations without having to return to the central distribution center to add loads, saving flight hours and expenses by providing the capability to distribute loads with one mission rather than multiple missions as are presently occuring. Moreover, the hook assembly 100 with the release and actuation assembly 180 for each individual arm 132a, 132b and 132c allows for a single cargo hook that can be used as both a grappling hook to capture loads without ground support personnel hooking up the loads to the device, and at the same time providing for multiple loads to be attached to each arm of the hook with ground support personnel hooking up the loads, which is an improvement over conventional devices that do not allow both unattended hookup, and multiple load release capability.

Referring to FIGS. 6A-6C, each of the arms 132 may be actuated to an open position from a closed position as well as returned to a closed position by the actuation assembly 180 operation and the mechanical sliding of base pivot 192 in the one or more slots 209. As shown in FIG. 6A, with the release and actuation assembly 180 in the closed position such as in FIG. 3, the lip catch 187 of the cam 185 is held by the upper roller 183 such that the root arm segment 200 is in the closed position. Actuating the drive assembly 210, for example with respect to arm 132a, the motor 211 actuates gear 212 driving the drive wheel 217 and upper driveshaft 218 which may have an upper sleeve bearing 219. The drive wheel 217 turns the threaded driveshaft drawing the lower block 167 having assembly base block arms 191 secured to base pivot 192 raising the base pivot 192 along slot 209 as is illustrated in FIGS. 6B and 6C. In operation, the hook assembly 100 using the controller 150 may actuate and release all arms 132a, 132b and 132c in an emergency situation or if the load is intended for that single location. Advantageously, according to an embodiment of the present invention, the hook assembly 100 may operate each of the arms 132 independently, for example, individual arm 132a independent from other arms 132b and 132c, as shown in FIGS. 6A-6c, so as to be actuated and release the load disposed thereon.

Accordingly, and as is further set forth herein, the hook assembly 100 provides unique advantages including a low cost efficient and effective apparatus, system and method to capture of payloads without the use of ground or attendant personnel to secure the load on the lifting device. A cargo hook that has all the previous attributes and in addition provides for independent arm 132 release. For example, each arm 132a, 132b, and 132c can now be independently released while carrying the full load on each of the arms 132, whereas conventional grappling hooks carrying cargo require a singular release of the load.

Referring to FIGS. 1, 2A-2B, 3 and 4, a release and actuation assembly 180 is illustrated to maintain the arm(s) 132 in the closed position, as well as to release on-demand individual arms 132a, 132b, and 132c using the controller 150. According to an embodiment of the present invention, the arms 132a, 132b and 132c may be formed with each arms having release and actuation mechanism comprising a release and actuation assembly 180 for capturing and releasing the cargo, which advantageously lightens the weight of hook components. Each of root arm 200 segment of the arms 132a, 132b, and 132c incorporate a spring 204 in the arm extension segment 202 to alleviate shocks imparted from loads to the release and actuation mechanism, e.g. the hook assembly 100 is formed to impact on loads suffered by the hook if hitting obstacles or hitting the ground, or other similar impact loads that would otherwise be transferred to the release and actuation assembly 180, which in the past may have required forming these components from heavier components to endure such loading.

While certain configurations of structures have been illustrated for the purposes of presenting the basic structures of the present invention, one of ordinary skill in the art will appreciate that other variations are possible which would still fall within the scope of the appended claims. For example, power or energy source for the hook capture arm actuation can be provided by any acceptable means, whether an energy storage device such as a battery, pneumatic or hydraulic accumulator, or a continuous energy source such as direct wiring to the host lifting platform. Alternatively, the motor 122 and actuator can be a direct gear drive whereby the hook arms 132 incorporate gear teeth that interface with screw threads on the actuator 122 whereby the hook arms 132 are rotated between the open and close position as the corresponding screw threads in the actuator 122 turn or rotate thereby causing the gear teeth in said hook arms to cause rotation about hook arm pivot. Advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:
1. A grappling hook apparatus comprising:
a main body comprising an enclosure operably coupled to an upper assembly for attaching and/or suspending the grappling hook and to a lower assembly for supporting a plurality of hook arms pivotally connected to said lower assembly by one or more links;
a control circuit operably connected to one or more motors cooperating with a drive wheel mounted on a driveshaft to move of said plurality of arms between said open position and said closed position, said control circuit further operably connected to a motor operably coupled to a bracket associated with one of said plurality of arms configured to move said bracket to release said one of said plurality of arms to said open position;
a release and actuation assembly, mounted to said main body structure, operably coupled to said plurality of hook arms, said release and actuation assembly comprises:
a drive assembly operably coupled to one or more motors cooperating with said drive wheel mounted on said driveshaft and operably connected to said control circuit, said driveshaft having threads cooperating with a threaded portion of said lower assembly, said driveshaft rotates by said control circuit energizing said one or more motors, said threaded portion of said lower assembly moves along said driveshaft and said lower assembly coupled to each of said plurality of hook arms pivot by said one or more links thereby rotating said plurality of hook arms between said open position and said closed position adapted for capturing a line attached to a load, and
an arm release motor assembly associated with each said one of said plurality of hook arms and operably connected to said control circuit, said arm release motor assembly comprising said motor operably coupled to said bracket, said bracket comprises an opening and a roller mounted in said opening, said in said opening configured to operably couple a lip catch on each of said plurality of hook arms so as to hold said one of said plurality of arms in said closed position by the connection of said lip catch adjacent said roller, said arm release motor configured to drive a gear wheel and a transverse gear located on an upper arm gear portion of a linkage assembly to move said bracket thereby releasing said lip catch from said opening allowing said one of said plurality of hook arms to move to said open position.

2. A hook assembly comprising:
a main body comprising an enclosure operably coupled to an upper assembly for attaching and/or suspending the grappling hook and to a lower assembly for supporting a plurality of hook arms pivotally connected to said lower assembly by one or more;
a control circuit operably connected to one or more motors cooperating with a drive wheel mounted on a driveshaft to move of said plurality of arms between said open position and said closed position, said control circuit further operably connected to a motor operably coupled to a bracket associated with one of said plurality of arms configured to move said bracket to release said one of said plurality of arms to said open position;
a release and actuation assembly, mounted to said main body structure, operably coupled to said plurality of hook arms, said release and actuation assembly comprises:
 a drive assembly operably coupled to one or more motors cooperating with said drive wheel mounted on said driveshaft and operably connected to said control circuit, said driveshaft having threads cooperating with a threaded portion of said lower assembly, said driveshaft rotates by said control circuit energizing said one or more motors, said threaded portion of said lower assembly moves along said driveshaft and said lower assembly coupled to each of said plurality of hook arms pivot by said one or more links thereby rotating said plurality of hook arms between said open position and said closed position adapted for capturing a line attached to a load, and
 an arm release motor assembly associated with each said one of said plurality of hook arms and operably connected to said control circuit, said arm release motor assembly comprising said motor operably coupled to said bracket, said bracket comprises an opening and a roller mounted in said opening, said in said opening configured to operably couple a lip catch on each of said plurality of hook arms so as to hold said one of said plurality of arms in said closed position by the connection of said lip catch adjacent said roller, said arm release motor configured to drive a gear wheel and a transverse gear located on an upper arm gear portion of a linkage assembly to move said bracket thereby releasing said lip catch from said opening allowing said one of said plurality of hook arms to move to said open position
wherein each of said plurality of hook arms comprising a root arm and an arm extension, said arm extension pivotally connected to said root arm; said arm extension being configured pivotable and biased by a spring allowing said arm extension to pivot about the root arm when an external force is applied, said spring being configured to limit an external force from applying a rotational force on said root arm when said external force is applied to said arm extension.

3. A grappling hook apparatus comprising:
a main body comprising an enclosure operably coupled to an upper assembly for attaching and/or suspending the grappling hook and to a lower assembly for supporting a plurality of hook arms pivotally connected to said lower assembly by one or more links;
a control circuit operably connected to one or more motors cooperating with a drive wheel mounted on a driveshaft to move of said plurality of arms between said open position and said closed position, said control circuit further operably connected to a motor operably coupled to a bracket associated with one of said plurality of arms configured to move said bracket to release said one of said plurality of arms to said open position;
a release and actuation assembly, mounted to said main body structure, operably coupled to said plurality of hook arms, said release and actuation assembly comprises:
 a drive assembly operably coupled to one or more motors cooperating with said drive wheel mounted on said driveshaft and operably connected to said control circuit, said driveshaft having threads cooperating with a threaded portion of said lower assembly, said driveshaft rotates by said control circuit energizing said one or more motors, said threaded portion of said lower assembly moves along said driveshaft and said lower assembly coupled to each of said plurality of hook arms pivot by said one or more links thereby rotating said plurality of hook arms between said open position and said closed position adapted for capturing a line attached to a load, and
 an arm release motor assembly associated with each said one of said plurality of hook arms and operably connected to said control circuit, said arm release motor assembly comprising said motor operably coupled to said bracket, said bracket comprises an opening and a roller mounted in said opening, said in said opening configured to operably couple a lip catch on each of said plurality of hook arms so as to hold said one of said plurality of arms in said closed position by the connection of said lip catch adjacent said roller, said arm release motor configured to drive a gear wheel and a transverse gear located on an upper arm gear portion of a linkage assembly to move said bracket thereby releasing said lip catch from said opening allowing said one of said plurality of arms to move to said open position; and
a controller for operating said grappling hook, said controller interacting with said control circuit to energize said release and actuation assembly so as to move individually said one of said plurality of arms to said open position.

4. A controllable grappling hook system as in claim 3 wherein said controller can be wired or wireless.

5. The hook assembly as in claim 3 wherein said controller provides hook assembly operational and usage status.

* * * * *